United States Patent [19]

Negi et al.

[11] Patent Number: 5,344,715
[45] Date of Patent: Sep. 6, 1994

[54] HEAT SHRINKABLE FILM AND MULTILAYERED FILM

[75] Inventors: Taichi Negi; Sumio Itamura; Satoshi Hirofuji, all of Kurashiki, Japan

[73] Assignee: Kuraray Co., Ltd., Kurashiki, Japan

[21] Appl. No.: 980,761

[22] Filed: Nov. 24, 1992

[30] Foreign Application Priority Data

Nov. 29, 1991 [JP] Japan .................................. 3-342440

[51] Int. Cl.$^5$ .............................................. B32B 27/08
[52] U.S. Cl. ................................... 428/520; 428/34.9; 428/36.7; 428/516; 428/522; 428/913
[58] Field of Search ............. 428/516, 522, 913, 34.9, 428/520, 36.7

[56] References Cited

U.S. PATENT DOCUMENTS

| | | | |
|---|---|---|---|
| 4,349,644 | 9/1982 | Iwanami et al. | 525/57 |
| 4,451,599 | 5/1984 | Odorzynski et al. | 524/169 |
| 4,500,677 | 2/1985 | Maruhashi | 525/57 |
| 4,552,801 | 11/1985 | Odorzynski et al. | 428/220 |
| 4,562,118 | 12/1985 | Maruhashi et al. | 428/412 |
| 4,590,131 | 5/1986 | Yazaki et al. | 428/516 |
| 4,613,644 | 9/1986 | Moritani et al. | 524/430 |
| 5,034,281 | 7/1991 | Kawasaki et al. | 428/522 |
| 5,082,743 | 1/1992 | Itamura et al. | 428/520 |

FOREIGN PATENT DOCUMENTS

| | | |
|---|---|---|
| 2115880 | 9/1977 | Japan . |
| 61-36365 | 10/1981 | Japan . |
| 0192705 | 10/1985 | Japan . |
| 0199004 | 10/1985 | Japan . |
| 1004752 | 1/1986 | Japan . |
| 2261847 | 10/1990 | Japan . |

*Primary Examiner*—Edith Buffalow
*Attorney, Agent, or Firm*—Kramer, Brufsky & Cifelli

[57] ABSTRACT

A heat shrinkable film or multilayered film comprising at least one layer comprising an EVOH (A) having an average ethylene content of 20 to 60 mol % and an areal shrinkage when immersed in hot water at 90° C. for 1 minute of at least 10% and having thermal characteristics satisfying the following condition (i)

$$1 \leq |\{T(1)-T(2)\}-\{t(1)-t(2)\}| \leq 20 \qquad (i)$$

wherein $1 \leq |t(1)-T(1)| \leq 20$ in the case of $T(1)=T(2)$ and $t(1)=t(2)$ and
wherein T(1) and T(2) represent peak temperature (°C.) on the highest temperature side and lowest temperature side respectively in differential scanning calorimetry (DSC) measurement of said EVOH (A) and t(1) and t(2) peak temperatures originating from T(1) and T(2), respectively, in DSC measurement of said EVOH having been treated with an alkaline solvent.

7 Claims, No Drawings

HEAT SHRINKABLE FILM AND MULTILAYERED FILM

BACKGROUND OF THE INVENTION

1. Field of the Invention

The present invention relates to a heat shrinkable film, in particular heat shrinkable multilayered film, utilizing an ethylene-vinyl alcohol copolymer (hereinafter referred to as "EVOH") composition having excellent heat stretchability, in particular that under low tension, that can be stretched while forming no pinholes, cracks, local non-uniform thicknesses or like defects, and having excellent heat shrinkability and gas barrier properties.

2. Description of the Prior Art

Fatty foods such as raw meat and processed meat mostly have irregular shapes and non-uniform sizes. To wrap these foods having various shapes, shrink-wrapping using heat shrinkable films and skin-pack system that carries out stretching, shrinkage and heat sealing at the same time through a skin-packer are commercially practiced.

The shrink-wrapping process generally comprises the successive steps of placing the contents in a tubular stretched film, removing the air inside the tube under reduced pressure and sealing the openings of the tube and shrinking the film to permit it to conform to the shape of the contents closely, thereby obtaining a neat package. The heating in this process is conducted, sometimes, also to sterilize the contents and generally at a temperature of 70° to 120° C.

The skin-pack process generally comprises the successive steps of passing an unoriented film through a skin-packer, heating the film in a heating zone to 60° to 200° C., in some cases thermoforming the film in a mold, immediately thereafter laying it, in vacuo, on the contents placed on a substrate film, sheet or tray, sealing the periphery, restoring the pressure to atmospheric pressure to permit the film to conform to the shape of the contents, thereby obtaining a neat package.

It is necessary that films usable in these processes have excellent gas barrier properties and the good property of conforming closely to the shape of the contents and be readily stretchable at 40° to 200° C. and, at the same time, sufficiently shrinkable by heating.

One may consider use of EVOH film having high gas barrier properties as the above stretchable-shrinkable film. The EVOH film having high gas barrier properties however has the disadvantage of poor stretchability-shrinkability.

Various processes have been proposed to solve this problem. For example, Japanese Patent Application Laid-open No. 115880/1977 proposed a composite film obtained by laminating EVOH film and a polyamide (PA) film and stretching the laminate, and Japanese Patent Application Laid-open No. 136365/1981 a multilayered film comprising a polyolefin layer, a PA layer and an EVOH layer.

Japanese Patent Application Laid-open No. 261847/1992 discloses a process which comprises heat stretching (e.g. heat biaxially stretching) an EVOH composition having an ethylene content of 20 to 60 mol % and at least 2 endothermic peaks upon DSC measurement to obtain multilayered articles (films, sheets, containers or the like), in particular thermoformed containers, that have no pinholes, cracks or local non-uniform thicknesses and excellent gas barrier properties. The document however does not describe provision of any heat shrinkable film or manufacturing conditions therefor.

U.S. Pat. No. 4,590,131 (Japanese Patent Application Laid-open No. 173038/1985) discloses a packaging material (film, sheet, container or the like) having excellent stretchability and comprising a composition of a plurality of EVOH's having different ethylene contents. Example 5 of the document describes that an inside bag with no cracks and usable for bag-in-box was obtained by co-extrusion molding by tubular film process a multilayered film comprising an intermediate layer of a blend of EVOH's and inner and outer layers of a linear low density polyethylene (LLDPE). The Example however does not describe obtaining a heat shrinkable film or manufacturing conditions therefor.

Japanese Patent Application Laid-open Nos. 192705/1985, 199004/1985 and 4752/1986 describe that a composition of EVOH's having different ethylene contents has improved stretchability, but do not describe obtaining any heat shrinkable film or manufacturing conditions therefor.

U.S. Pat. No. 4,349,644 (Japanese Patent Application Laid-open No. 86949/1981) describes that a composition of EVOH's having different ethylene contents has improved melt processability, but describes nothing about obtaining a heat shrinkable film or manufacturing conditions therefor.

Lamination of EVOH resin alone with a PA resin does not always improves stretchability, in particular that under low tension, and it can hardly be said that this method gives a film having excellent heat shrinkability.

There is still desired a film having high gas barrier properties and, at the same time, having excellent stretchability, heat shrinkability and dimensional stability.

SUMMARY OF THE INVENTION

Accordingly, an object of the present invention is to provide a multilayered film that has, while maintaining the high gas barrier properties inherent to EVOH, excellent stretchability, in particular that under low tension, and heat shrinkability causing little thickness non-uniformity after shrinkage.

The above object can be achieved by providing a heat shrinkable film or multilayered film comprising at least one layer comprising an EVOH (A) having an average ethylene content of 20 to 60 mol % and an areal shrinkage when immersed in hot water at 90° C. for 1 minute of at least 10% and having thermal characteristics satisfying the following condition (i)

$$1 \leq |\{T(1)-T(2)\}-\{t(1)-t(2)\}| \leq 20 \qquad (i)$$

wherein $1 \leq |t(1)-T(1)| \leq 20$ in the case of $T(1)=T(2)$ and $t(1)=t(2)$ and wherein T(1) and T(2) represent peak temperature (°C.) on the highest temperature side and lowest temperature side respectively in differential scanning calorimetry (DSC) measurement of said EVOH (A) and t(1) and t(2) peak temperatures originating from T(1) and T(2), respectively, in DSC measurement of said EVOH having been treated with an alkaline solvent.

The DSC measurement herein is conducted at a scanning speed of 10 m/min. The treatment with an alkaline solvent herein means a process which comprises the successive steps of dissolving 10 g of an EVOH specimen by boiling in 100 ml of a 30/70 by weight mixed solution of water/methanol, adding to the obtained solution 10 ml of a 120 g/l sodium hydroxide solution in methanol, boiling the mixture for 3 hours, throwing the mixture in cool water, separating the precipitate that forms, washing it sufficiently and drying.

For the above thermal characteristics preferred condition than (i) is:

$$1 \leq \{T(1) - T(2)\} - \{t(1) - t(2)\} \leq 20,$$
more preferably
$$3 \leq |\{T(1) - T(2)\} - \{t(1) - t(2)\}| \leq 20,$$
most preferably,
$$3 \leq \{T(1) - T(2)\} - \{t(1) - t(2)\} \leq 20.$$

In the case of $T(1)=T(2)$ and $t(1)=t(2)$, preferred condition is $1 < t(1) - T(1) \leq 20$, more preferably $3 \leq t(1) - T(1) \leq 20$.

DETAILED DESCRIPTION OF THE PREFERRED EMBODIMENTS

The EVOH (A) satisfying the above condition (i) is obtained by using a composition comprising at least 2 EVOH's having, representatively, different ethylene contents or saponification degrees, more preferably different ethylene contents and saponification degrees. For example, where 2 EVOH's having different ethylene contents and saponification degrees are named EVOH (a) and EVOH (b), the above object can be achieved by providing a composition comprising 5 to 95% by weight of EVOH (a) and 95 to 5% by weight of EVOH (b).

In the present invention, EVOH's are saponified products of ethylene-vinyl ester copolymers. EVOH (a) and EVOH (b) each has an ethylene content of 20 to 60 mol %, preferably 22 to 58 mol % with the difference between the ethylene contents of the two EVOH's being preferably at least 3 mol %, more preferably at least 4 mol % and preferably not more than 10 mol %. Selection of the saponification degrees for the two EVOH's is also important and it is desirable that the two saponification degrees differ from each other by at least 2 mol %, more preferably by at least 3 mol % and be selected from a range of at least 90 mol % on an average. The desirable upper limit of the difference between the saponification degrees is 10 mol %. Representative example of the vinyl ester herein is vinyl acetate, but other aliphatic vinyl esters such as vinyl propionate and vinyl pivalate may also be used.

If the average ethylene content of EVOH (a) and EVOH (b) is less than 20 mol %, the melt formability will be poor. If it exceeds 60 mol %, the gas barrier properties will be insufficient. If the average saponification degree is less than 90 mol %, the gas barrier properties and thermal stability will become worse. If the difference between the ethylene contents of EVOH (a) and EVOH (b) is less than 3 mol %, there cannot be obtained a good balance between improvements in the moldability (stretchability and heat shrinkability) and gas barrier properties. Either EVOH (a) or EVOH (b) may have larger ethylene content. The EVOH (A) in the present invention can include, besides 2-kind blends of EVOH (a) and EVOH (b), blends comprising EVOH (a), EVOH (b) and other EVOH's.

The EVOH (A) used in the present invention may be obtained by blending EVOH (a) and EVOH (b) or, more effectively, blending ethylene-vinyl ester copolymers using a solvent and saponifying the blend. That is, rather than use of a blend of EVOH's having different saponification degrees, better improvement in stretchability and shrinkability with high reproducibility is achieved by the use of a composition satisfying condition. (i) and obtained by the following process. The process comprises solution blending ethylene-vinyl ester copolymers having different ethylene contents (by at least 3 mol %) in a solvent and saponifying the blend in the presence of an acid or alkaline catalyst. Saponification of ethylene-vinyl ester copolymers having different ethylene contents gives, due to their different saponification rates, EVOH's having different saponification degrees.

In the present invention, incorporation of a vinyl silane compound as a copolymerization component into the EVOH (A) in an amount of 0.0002 to 0.2 molt is effective for producing the stretchable and shrinkable multilayered film of the present invention. In this case, conformation between the melt viscosities of the resulting EVOH and the substrate used is improved, so that a uniform co-extrusion multilayered film can be produced. Furthermore, the stretchability and shrinkability are improved perhaps due to improvement in dispersibility of EVOH (a) with EVOH (b). Suitable vinyl silanes herein are represented by the following formulas (I) through (III).

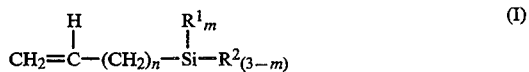

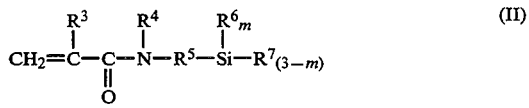

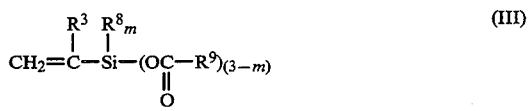

wherein n represents 0 or an integer of 1, m represents 0 or an integer of 1 or 2; $R^1$ represents a lower alkyl group, an aryl group or a lower alkyl group having an aryl group; $R^2$ represents an alkoxyl group having 1 to 40 carbon atoms, the alkoxyl group of which may have a substituent having an oxygen atom; $R^3$ represents a hydrogen atom or a methyl group; $R^4$ represents a hydrogen atom or a lower alkyl group; $R^5$ represents an alkyl group or a divalent organic residue comprising 2 carbon chains linked together via an oxygen atom or a nitrogen atom; $R^6$ represents a hydrogen atom, a halogen atom, a lower alkyl group, an aryl group or a lower alkyl group having an aryl group; $R^7$ represents an alkoxyl group or acyloxyl group which may have a substituent having an oxygen atom or a nitrogen atom; $R^8$ represents a hydrogen atom, a halogen atom, a lower alkyl group, an aryl group or a lower alkyl group having an aryl group and $R^9$ represents a lower alkyl group In more detail, $R^1$ represents a lower alkyl group having 1 to 5 carbon atoms, an aryl group having 6 to 18 carbon atoms or a lower alkyl group having 1 to 5 carbon atoms and having an aryl group having 6 to 18 carbon atoms; $R^4$ represents a hydrogen atom or a lower alkyl group having 1 to 5 carbon atoms; $R^5$ represents a lower alkyl group having 1 to 5 carbon atoms or an divalent organic residue comprising 2 carbon chains linked together via an oxygen atom or a nitrogen atom; $R^6$ represents a hydrogen atom, a halogen atom, a lower alkyl group having 1 to 5 carbon atoms, an aryl group having 6 to 18 carbon atoms or a lower alkyl group having 1 to 5 carbon atoms and having an aryl group having 6 to 18 carbon atoms; $R^7$ represents an alkoxyl group or acyloxyl group which may have a substituent having an oxygen group or a nitrogen group; $R^8$ represents a hydrogen atom, a halogen atom, a lower alkyl group having 1 to 5 carbon atoms, an aryl group having 6 to 18 carbon atoms or a lower alkyl group having 1 to 5 carbon atoms and having an aryl group having 6 to 18 carbon atoms and $R^9$ represents a lower alkyl group having 1 to 5 carbon atoms.

Concrete examples of the vinyl silane compounds (I) through (III) are vinyltrimethoxysilane, vinyltriethoxysilane, vinyltri(β-methoxyethoxy)silane and γ-methacryloyloxypropylmethoxysilane, among which preferably used are vinyltrimethoxysilane and vinyltriethoxysilane.

The EVOH (A) may, within limits not to impair the purpose of the present invention, be copolymerized with other copolymerizable monomers, e.g. propylene, butylene and unsaturated carboxylic acids or esters thereof, such as (meth)acrylic acid, methyl or ethyl (meth)acrylate, and vinylpyrrolidones such as N-vinylpyrrolidone or may further be blended with a heat stabilizer, ultraviolet absorber, antioxidant, color, filler or other resins (polyamide, partially saponified ethylene-vinyl acetate-copolymer and the like). The EVOH (A) used in the present invention preferably has a melt index (MI; at 190° C. under a load of 2160 g) of 0.1 to 50 g/10 min, more preferably 0.5 to 20 g/10 min.

In the present invention, the heat shrinkable film may comprise a film comprising a layer of the EVOH (A) alone, but it is more effective that the film comprise a multi-layered film comprising the EVOH (A) layer and other resin layer(s) laminated on one side or both side of the EVOH (A) layer. The other resin layer herein is selected from heat shrinkable thermoplastic resin layers, the resin type and the like of which are the same as those of the later-described (D) layer.

Satisfaction of condition (i) realizes of a film or multilayered film having excellent stretchability, in particular that under low tension, and excellent shrinkability, which fact will become apparent from Examples to be described later herein.

Another very effective embodiment of the film of the present invention is described now. This film has an excellent stretchability and excellent and uniform heat shrinkability with little thickness unevenness after shrinkage, and has, at the same time, good gas barrier properties. The film is a multilayered film comprising a composition layer (C) comprising 100 parts by weight of EVOH (A) and 0.1 to 30 parts by weight of a compound (B). satisfying the following conditions (iv) and (v) and, laminated therewith, preferably laminated directly therewith, a resin layer (D) satisfying the following condition (v).

$$5.5 \geq 19 - CH(A) \times 0.1 - SP(B) \geq 1.5 \quad \text{(iv)}$$

$$-1 \leq SP(S) - SP(D) \leq 3.5 \quad \text{(v)}$$

wherein CH(A) represents the average ethylene content in mol % of EVOH (A), SP(B) represents the solubility parameter (Fedors's formula) of the compound (B) and SP (D) represents the solubility parameter (Fedor's formula) of the resin (D) constituting the resin layer (D).

That is, where the compound (B) contained in the EVOH composition (C) satisfies the conditions (iv) and (v), the as-extruded multilayered film before stretching has improved stretchability and gives, after stretching, a multilayered film having excellent heat shrinkability and having restored gas barrier properties due to migration of compound (B) in composition layer (C) into resin layer (D).

It is more preferred that composition (B) satisfy the following conditions (iv)' and (v)'.

$$5.2 \geq 19 - CH(A) \times 0.1 - SP(B) \geq 2 \quad \text{(iv)}'$$

$$-1 \leq SP(B) - SP(D) \leq 3 \quad \text{(v)}'$$

Multilayered films satisfying the conditions (iv) and (v) and comprising a layer which comprises EVOH (A) satisfying the condition (i) have markedly excellent stretchability and uniform and excellent heat shrinkability and, at the same time, have good gas barrier properties.

In the present invention, addition to EVOH (A) of a compound (B) satisfying condition (iv) presents a preferred embodiment. With the obtained composition (C), the stretchability of the as-extruded film is improved and the shrinkability of the stretched film is also significantly improved, with little deterioration of gas barrier properties. Further extensive studies revealed that where a resin layer (D) directly contacting the composition layer (C) satisfies, in the relationship to compound (B), the condition (v), there can be improved not only the stretchability and shrinkability of the resulting multilayered film but, surprisingly, the gas barrier properties.

It is particularly worth notice that the gas barrier properties and, in some cases, the shrinkability of the resulting multilayered heat shrinkable film become better with elapse of time. The mechanism of this is not clear but it is considered to be as follows. In the composition layer (C), the compound (B), which has played a role of improving processability in the film formation and stretching of the multilayered film, migrates gradually during storage to the resin layer (D) contacting the composition layer (C), thereby improving the gas barrier properties and, in some cases, the shrinkability of the composition layer (C).

Examples of the compound (B) are hydrophobic plasticizers, such as aromatic esters, aliphatic esters, phosphoric acid esters and epoxy compounds of the foregoing. Examples of the aromatic esters are dibutyl phthalate, dioctyl phthalate, diheptyl phthalate, di-2-ethylhexyl phthalate, dicyclohexyl phthalate, butyllauryl phthalate, diisooctyl phthalate, butyl coconut-alkyl phthalate, ditridecyl phthalate, dilauryl phthalate, diisodecyl phthalate, butylbenzyl phthalate, octyldecanoyl phthalate, dimethylglycol phthalate, ethylphthalyl glycolate, methylphthalylethylene glycolate, butylphthalylbutylene glycolate, dinonyl phthalate, diheptyyl phthalate, octyldecyl phthalate, ditridecyl phthalate, butylbenzyl phthalate, dicapryl phthalate, di-3,5,5-timethylhexyl phthalate, isooctylisodecyl phthalate, dimethoxethyl phthalate, dibutoxydiethyl phthalate, bis(-diethylene glycol monomethyl ether) phthalate and benzophenol. Examples of the aliphatic esters are esters (e.g. mono-, di- and triesters) of polyhydric alsohols (e.g. di-, tri- and other polyhydric alcohols) and higher aliphatic acid having 8 to 30 carbon atoms, such as glycerine monostearate, glycerine distearate, glycerine tristearate, polypropylene adipate, diisodecyl adipate, di-2-methylhexyl adipate, dicapryl adipate, diisooctyl adipate, octyldecyl adipate, isooctylisodecyl adipate, dibutyl fumarate, dioctyl fumarate, triethyl citrate, acetyltriethyl citrate, tributyl citrate, acetyltributyl citrate and acetyltri-2-ethylhexyl citrate. Examples of the phosphoric acid esters are tricresyl phosphate, phenyldicresyl phosphate, xylenyldicresyl phosphate, cresyldixylenyl phosphate, triphenyl phosphate, tributyl phosphate, trichloroethyl phosphate, trioctyl phosphate, triethyl phosphate, arylalkyl phosphate and diphenylmonoorthoxenyl phosphate. Examples of the epoxy compounds are epoxy monoesters, butylepoxy stearate, octylepoxy stearate, epoxybutyl oleate, epoxized butyl oleate, epoxized soybean oil, epoxized linseed oil, epoxized alkyl oil and epoxized alkyl oil alcohol ester. Among these compounds, particularly preferred are epoxized soybean oil, epoxized linseed oil,.diethylhexyl adipate, diisooctyl adipate, glycerine monostearate, glycerine tristearate, benzophenol, dibutyl phthalate, diethyl phthalate, di-2-ethylhexyl phthalate, butylbenzyl phthalate, methylphthalylethylene glycol and the like. The compound (B) is incorporated in an amount of 0.1 to 30 parts by weight based on 100 parts by weight of EVOH (A), preferably 1 to 20 parts by weight on the same basis.

Separately, there can be used, other additives than the above compound (B), to improve the compatibility of EVOH (A) with compound (B) and the thermal stability. Examples of the agent are those for improving compatibility and thermal stability and described in U.S. Pat. No. 4,613,644 (Japanese Patent Application Laid-open No. 199040/1985) and its examples are aromatic carboxylic acids, aliphatic carboxylic acids, phosphoric acids or metal salts, metal complexes or metal oxides of the foregoing. These additives may be used alone or in combination and preferably in an amount of 0.001 to 1 part by weight based on 100 parts by weight of EVOH (A), more preferably 0.01 to 1 part by weight on the same basis, most preferably 0.01 to 0.5 part by weight on the same basis. Suitable metal ions to be used are alkali metals, alkali earth metals and amphoteric metals. Concrete examples of the improving agent are calcium acetate, sodium acetate, magnesium acetate, potassium acetate, zinc acetate, lithium acetate, calcium phosphate, potassium phosphate, magnesium phosphate, lithium phosphate, sodium phosphate, sodium stearate, calcium stearate, potassium stearate, magnesium stearate, zinc stearate, lithium stearate, sodium salt of ethylenediaminetetraacetic acid, calcium oxide, magnesium oxide and hydrotalcites. Among these compounds, particularly preferred are sodium stearate, calcium stearate, potassium stearate, magnesium stearate, calcium acetate, sodium acetate, magnesium acetate, hydrotalcites (e.g. $Mg_6Al_2(OH)_{16}CO_3.4H_2O$) and the like.

Use of these additives can, when melt molding is conducted at a high temperature and for a long period of time, prevent generation of thermally degraded matter such as gels and improve the stretchability and heat shrinkability.

These additives can also be incorporated into EVOH (A) containing no compound (B).

The multilayered film of the present invention comprises at least EVOH (A) layer and/or composition layer (C) and resin layer (D) {hereinafter referred to as "layer (G)", naming EVOH (A) layer and/or composition layer (C) generically)} and may comprise 2 or more layers of each of these layers. Where the film comprises 2 or more layers (G) and 2 or more resin layers (D), the resin compositions constituting each of the layers may be the same or different. In this case, it is desirable that at least one resin layer (D) directly contact composition layer (G).

While it is necessary that the multilayered film of the present invention comprise at least one layer (G) and at least one resin layer (D), other thermoplastic resin layers may also be laminated to add various functions.

It is important that the resin layer (D) satisfy condition (v) and use of such resin layer (D) permits the compound (B) in layer (G) contacting resin layer (D) to migrate into resin layer (D), thereby restoring the gas barrier properties.

It is important that the resin of the resin layer (D) be heat shrinkable thermoplastic resin and its preferred examples are olefin resins. Examples of preferred olefin resins are copolymers of ethylene and vinyl ester monomers, such as ethylene-vinyl acetate copolymers (hereinafter referred to as EVA); copolymers of ethylene with an aliphatic unsaturated carboxylic acid or aliphatic unsaturated carboxylic acid ester, such as acrylic acid, acrylic acid esters, methacrylic acid or methacrylic acid esters); ionomer resins; linear low density polyethylene (hereinafter referred to as LLDPE); mixed resins of LLDPE and EVA, very low density polyethylene (hereinafter referred to as VLDPE) having a density of not more than 0.91 $g/cm^3$ and a Vicat softening point (as measured in accordance with ASTM D-1525) of not more than 95° C., preferably not more than 85° C.; mixed resins of VLDPE and a small amount of LLDPE and mixed resins of crystalline propyleneethylene copolymer and polypropylene-based elastomer.

Preferred EVA's are those having a vinyl acetate content of 3 to 19% by weight. Preferred mixed resins of LLDPE and EVA are those containing at least 55% by weight of EVA from the viewpoint of stretchability. Examples of preferred LLDPE are copolymers of ethylene with a small amount of an α-olefin having 4 to 18 carbon atoms such as butene-1, pentene-1 or octene-1 and having a crystal melting point of 118° to 125° C. Preferred ionomer resins are ion-crosslinked compounds obtained by partially saponifying copolymers of an α-olefin such as ethylene or propylene with an unsaturated carboxylic acid such as acrylic acid, methacrylic acid or maleic acid or esters thereof and then partially neutralizing the anionic part of the resulting products with a metal ion such as Na, K, Mg, Ca or Zn. Among these neutralizing ions, Na or Zn is generally used. Ionomer resins obtained by partially neutralizing with divalent metal ion may incorporate polyamide oligomer.

Examples of resin layer (D) suitably used are olefin polymers or copolymers, e.g. polyethylenes (LDPE, LLDPE and VLDPE), ethylene-vinyl acetate copolymers and ethylene-(meth)acrylate (methyl ester or ethyl ester) copolymers grafted with an unsaturated carboxylic acid or its anhydride, such as maleic anhydride. They are generally used as adhesive resins.

Polyamide resins (PA). are also usable for resin layer (D). Examples of PA are binary or more copolymers of nylon 6, nylon 9, nylon 11, nylon 12, nylon 6,6, nylon 6,9, nylon 6,11 and nylon 6,12, and nylon 6, nylon 9, nylon 11, nylon 12, nylon 6,6, nylon 6,9, nylon 6,11 and nylon 6,12. Also preferred are aromatic-based nylons having better gas barrier properties than the above nylons, such as co-condensation polymers of adipic acid and metaxylylenediamine, those of hexamethylenediamine and m,p-phthalic acid and copolymers or blends of the foregoing with the above PA resin.

While it is desirable that these resin layers (D) be laminated directly on one surface or both surfaces of layer (G), they can also be provided at positions not directly contacting layer (G). In these cases, other constituting resin layers containing recovered resin or reuse resin can be provided in between.

These layer (G), resin layer (D) and other constituting resin layers may further incorporate, within limits not to impair the stretchability and gas barrier properties, inorganic additives such as inorganic filler and pigment and/or organic additives and regeneratables such as trims and wastes that form during film manufacturing process.

The resin layer (D) in the multilayered film of the present invention preferably has a thickness (after stretching) of at least $3\mu$ in view of thermal resistance and not more than $1,000\mu$ in view of stretchability and dimensional stability, and more preferably in a range of 5 to $500\mu$. The thickness of layer (G) is preferably 3 to $20\mu$, more preferably 3 to $15\mu$ in view of acceptable balance between the gas barrier properties and stretchability. It is desirable that the resin layer (D) have larger thickness than layer (G) and, where there are provided 2 or more layers each of layer (G) and resin layer (D), the total thickness of the resin layers (D) be larger than the total thickness of layers (G). The thickness of the entire multilayered film is preferably 6 to $1,200\mu$, more preferably 10 to $1,000\mu$.

With respect to the construction of the multilayered film, representative examples are (1) layer (G)/resin layer (D)/resin layer (D), (2) resin layer (D)/resin layer (D)/layer (G)/resin layer (D)/resin layer (D), (3) resin layer (D)/resin layer (D)/layer (G)/resin layer (D) /adhesive layer/resin layer (D), (4) resin layer (D)/layer (G)/resin layer (D)/resin layer (D), (5) resin layer (D)/resin layer (D)/layer (G)/resin layer (D)/resin layer (D) /adhesive layer/resin layer (D) and (6) layer (G)/resin layer (D). In these examples, resin layers (D) may be the same or different.

The heat shrinkable film, in particular heat shrinkable multilayered film, of the present invention is produced by the following processes.

Layer (G), resin layer (D) and other optional constituting layers are laminated with each other by extrusion lamination, dry lamination, co-extrusion lamination, co-extrusion sheet molding, co-extrusion tubular film process, solution coating or like processes, to give a laminate. With extrusion molding, it is desirable that the extruded laminate be immediately quenched to become as amorphous as possible. Then, the obtained laminate is, at a temperature below the melting point of EVOH (A), uniaxially or, preferably, biaxially stretched by roll stretching, pantagraph stretching, tubular film expansion or like processes. It may be preferable for the purpose of improving stretchability, to, prior to stretching, irradiate the laminate with radioactive rays, electron beams, ultraviolet rays or the like, to crosslink the layer (G) and resin layer (D) (in particular polyolefin resin layer). Also effective for this purpose are addition of a chemically crosslinking agent upon extrusion or use of a multilayered structure comprising a crosslinked polyolefin layer and, laminated therewith, layer (G) and resin layer (D). The stretch ratio (draw ratio) is, in the longitudinal and/or transverse direction 1.3 to 9, preferably 1.5 to 4. The areal stretch ratio is preferably 2 to 36. The heating temperature for the stretching is 50° to 140° C., preferably 60° to 100° C. If the heating temperature is less than 50° C., the stretchability will become poor and the dimensional change will increase. If the heating temperature exceeds 140° C., the desired heat shrinkage ratio will not be obtained.

The thus heat stretched film may, while being maintained under tension, be heat set at a little higher temperature than the above heating temperature for the stretching for a short time (e.g. 1 to 30 seconds), to give the heat shrinkable film or heat shrinkable multilayered film of the present invention.

In the present invention, layer (G) may have any moisture content with no specific limitation, but the moisture content is preferably in a range of 0.001 to 10% by weight.

It is necessary for a heat shrinkable film to, when subjected to shrinking treatment, shrink uniformly over its entire surface. Non-uniform shrinkage causes the contents to deform, deflect or collapse locally. It is generally considered that the non-uniform stretching produces, upon shrinking treatment, the above abnormal shrinkages.

The heat shrinkable film (including multilayered film) of the present invention obtained under the above-described stretching conditions has uniform stretchability, and the value $X_2=$(maximum thickness−minimum thickness)/average thickness is not more than 1, in particular not more than 0.9, more preferably not more than 0.8, thus suppressing development of the above abnormal shrinkages. Further we take as an index of uniform stretchability, the changing ratio of non-uniform thickness, X, using an as-extruded film before stretching and biaxially stretching it. It is preferred that the changing ratio be not more than 30, more preferably not more than 20. To lower the changing ratio X to achieve uniform stretching, the directions of increasing the stretch ratio, increasing the stretching speed and decreasing the stretching temperature. These directions however generates film breakage or the like and decreases the productivity to a large extent, which is caused by the raw materials used, in particular poorly stretchable EVOH. It has been found, surprisingly, that the use of the above layer (G) of the present invention can markedly solve the above problem, in particular improve the stretchability under low tension.

It sometimes happens that local non-uniform shrinkages cannot be completely explained by the above non-uniformity in stretching. That is, there happens, even with a small X, wrinkle-like appearance on the film surface after shrinkage. The reason is not clear but attributable to local variation in shrinking force, i.e. production of anisotropy in shrinking force.

The heat shrinkable film of the present invention has uniform shrinkability and the value represented by $Y_2=$(maximum thickness−minimum thickness)/average thickness is not more than 3, in particular not more than 2.5, more preferably not more than 2. Further we, therefore, also take the changing ratio of uniform thicknesses after shrinkage, Y, as an index of non-uniform shrinkage. To achieve uniform shrinkage and good appearance, it is desirable that the changing ratio Y be not more than 5, more preferably not more than 4. Conventional low shrinking EVOH can hardly satisfy this condition. Quite unexpectedly, the above layer (G) used in the present invention can solve the above problem markedly, thereby providing a shrunk film having good appearance.

$$X = X_2/X_1 \qquad \text{(ii)}$$

wherein:
$X_1 =$ (maximum thickness−minimum thickness)/average thickness (before stretching)
$X_2 =$ (maximum thickness−minimum thickness)/average thickness (after stretching)

$$Y = Y_2/Y_1 \qquad \text{(iii)}$$

wherein:
$Y_1 =$ (maximum thickness−minimum thickness)/average thickness (before heat shrinkage)
$Y_2 =$ (maximum thickness−minimum thickness)/average thickness (after heat shrinkage)

The film or multilayered film of the present invention shows a shrinkage when immersed in hot water at 90° C. for minute of at least 10% both in the longitudinal and transverse directions, preferably at least 15% in both directions, more preferably at least 30% in both directions. Accordingly, the film or multilayered film of the present invention has excellent heat shrinkability and has an "areal shrinkage" (see Note 3 of Table 3 for the definition) when immersed in hot water at 90° C. for 1 minute of at least 10%, preferably at least 20%, more preferably at least 25%, still more preferably at least 30%, most preferably at least 50%. The upper limit of the areal shrinkage is 90%. If the areal shrinkage is less than 10%, the resulting film, having wrapped the contents, will have many wrinkles and will not neatly conform to the shape of the contents, thereby deteriorating the appearance of the package. The films having an areal shrinkage of preferably at least 30%, more preferably at least 50% are particularly suitable for packing raw meat.

Other features of the invention will become apparent in the course of the following descriptions of exemplary embodiments which are given for illustration of the invention and are not intended to be limiting thereof.

EXAMPLE 1

There were solution-blended, in a 85/15 by weight mixed solution of methanol/water containing 1,000 ppm of hydrotalcite dispersed therein, 50 parts by weight of an EVOH (a) having an ethylene content of 38 mol %, a saponification degree of 99.5 mol % and a melt index (190° C., 2160 g) of 5.5 g/10 min and 50 parts by weight of an EVOH (b) having an ethylene content of 48 mol %, saponification degree of 96.4 mol % and a melt index (190° C., 2160 g) of 5.8 g/10 min. After removal of the solvent, the blend was dried, to give an EVOH composition (A).

A multilayered sheet was prepared by molding the thus obtained EVOH (A) through a 3-kind/5-layer co-extrusion equipment and quenching the obtained sheet through nip rolls maintained at 5° C. The sheet had a construction of a layer (D) each of an ethylene-vinyl acetate copolymer (EVA, Evaflex EV-340, made by Mistui dupont Polychemical Co.) for outermost layers, a layer (D) each of an adhesive (Admer VF-600, made by Mitsui Petrochemical Industries, Ltd.) and the intermediate layer of the above EVOH composition (A). Each of the outermost layers had a thickness of 300 μm and each of the adhesive layers and the intermediate layer had a thickness of 50μ. The sheet was then simultaneously biaxially stretched through a pantagraph type biaxially stretching machine at a temperature of 70° C. and in a stretch ratio of 3×3.

The heat shrinkable multilayered film thus obtained had comparatively good appearance and transparency, with only a few cracks, unevenness and thicker portions. The film was conditioned at 20° C., 100% RH and then tested for oxygen transmission rate (with Type 10/50, made by Mocon Co.), to show a good value of 30 cc.20μ/m².24hr.atm. The film showed, when immersed in hot water at 90° C. for 1 minute, an areal shrinkage of 60%. The multilayered film was folded in two and both sides were heatsealed to give a bag. Raw meat was placed in the bag and then the opening was heatsealed under vacuum. The vacuum package thus prepared was then immersed in hot water at 80° C. or 15 seconds, to shrink the film. The film conformed well to the shape of the raw meat without forming any crease. The contents were little deformed abnormally. The package thus had a comparatively good appearance.

A similar multilayered film was separately prepared by changing each of the thicknesses to 30μ for both outermost layers, 5μ for both adhesive layers and 10μ for the above EVOH (A) layer. The film thus obtained was used with a skin-pack machine (made by Multivack Co.) to carry out skin-packing. Then, the packages obtained had comparatively good appearance with only a few creases and collapses of the contents. The results are shown in Tables 1 and 3.

EXAMPLE 2

There were solution-blended in methanol solvent to a concentration of 10% by weight 50 parts by weight of an ethylene-vinyl acetate copolymer having an ethylene content of 38 mol % and 50 parts by weight of another ethylene-vinyl acetate copolymer having an ethylene content of 48 mol % and a vinyltrimethoxy-silane content of 0.015 mol %. To the solution, with boiling and methanol vapor being blown into, a sodium hydroxide solution in methanol (molar ratio of sodium hydroxide: 0.15) was added dropwise, to saponify the vinyl acetate component. After removal of the solvent, the residue was washed and dried, to give an EVOH composition (A).

The EVOH (A) thus obtained was evaluated in the same manner as in Example 1. The results are shown in Tables 1 and 3.

EXAMPLE 5

There were dry blended to 50 parts by weight of an EVOH (a) having an ethylene content of 44 mol %, a saponification degree of 96.5 mol % and a melt index (190° C., 2160 g) of 5.5 g/10 min and 50 parts by weight of an EVOH (b) having an ethylene content of 48 mol %, saponification degree of 99.6% and a melt index (190° C., 2160 g) of 5.8 g/10 min, 1000 ppm/resin of hydrotalcite and 4 parts by weight/resin of a compound (B) (diethyl phthalate). The blend obtained was pelletized through a 30-φ twin-screw extruder at 220° C., to give an EVOH composition (A).

A 5-layer sheet was prepared by molding the thus obtained EVOH composition (A) through a 3-kind/5-layer co-extrusion equipment, followed by through quenching through nip rolls at 5° C. The sheet had a construction of a layer each of an ethylene-vinyl acetate copolymer (EVA, Evaflex EV-340, made by Mistui dupont Polychemical Co.) for outer-most layers, a layer each of an adhesive (D) (Admer VF-600, EVA modified with maleic anhydride and made by Mitsui Petrochemical Industries, Ltd.) and the intermediate layer of the above EVOH composition (A). Each of the outermost layers had a thickness of 300μ and each of the adhesive layers and the intermediate layer (A) had a thickness of 50μ. The sheet was then simultaneously biaxially stretched through a pantagraph type biaxially stretching machine at a temperature of 70° C. and in a stretch ratio of 3×3, and then heat set at 75° C. for 5 seconds to increase the dimensional stability under relaxed condition, to give a multilayered heat shrinkable film. The sheet showed good stretchability.

The heat shrinkable multilayered film thus obtained had comparatively good appearance (transparency, gels and aggregates) with only a few cracks, unevenness and thicker portions. The film was conditioned at 20° C., 100% RH and tested for oxygen transmission rate (with Type 10/50, made by Mocon Co.), to show a good value of 31 cc.20μ/m².24hr.atm. The film showed, when immersed in hot water at 90° C. for 1 minute, an areal shrinkage of 67%. Another specimen of the film was allowed to stand for 1 month (in a dry state) and, after being conditioned at 20° C., 100% RH, tested for oxygen transmission rate and heat shrinkage. It showed a still better value of 20 cc.20μ/m².24hr.atm.

A similar multilayered film was separately prepared by changing each of the thicknesses to 30μ for both outermost layers, 5μ for both adhesive layers and 10μ for the above EVOH composition layer. The film thus obtained was used with a skin-pack machine (made by Multivack Co.) to carry out skin-packing. Then, the packages obtained had comparatively good appearance with only a few creases and collapses of the contents. The results are shown in Tables 1 and 3.

EXAMPLE 8

There were solution-blended in methanol solvent to a concentration of 10% by weight 70 parts by weight of an ethylene-vinyl acetate copolymer having an ethylene content of 48 mol % and another ethylene-vinyl acetate copolymer having an ethylene content of 52 mol % and a trimethoxyvinylsilane content of 0.015 mol %. To the solution, with boiling and methanol vapor being blown into, a sodium hydroxide solution in methanol (molar ratio of sodium hydroxide: 0.15) was added dropwise, to saponify the vinyl acetate component. After removal of the solvent, the residue was washed and dried, to give an EVOH. Into the EVOH thus obtained, 1,000 ppm/resin of hydrotalcite and 4 parts by weight/resin of a compound (B) (glycerine monostearate). The blend was pelletized through a 30-φ twin-screw extruder at 220° C. to give an EVOH composition (A).

The EVOH (A) thus obtained was evaluated in the same manner as in Example 1. The results are shown in Tables 1 and 3.

EXAMPLE 9

The procedure described in the first half of Example 5 was followed except that the multilayered sheet before stretching was irradiated with 5 Mrad of electron beams, to obtain a multilayered heat shrinkable film. The film obtained was evaluated in the same manner as in Example 5 and the results are shown in Tables 1 and 3.

EXAMPLES 3, 7, 10 and 11 AND COMPARATIVE EXAMPLES 3 AND 4

Example 2 was repeated except for the changes shown in Tables 1 and 2, to obtain films. The results are shown in Tables 1 and 3.

EXAMPLE 4 AND COMPARATIVE EXAMPLES 1 AND 2

Example 1 was repeated except for the changes shown in Tables 1 and 2, to obtain films. The results are shown in Tables 1 and 3.

EXAMPLE 6

Example 5 was repeated except for the changes shown in Tables 1 and 2, to obtain films. The results are shown in Tables 1 and 3.

Obviously, numerous modifications and variations of the present invention are possible in light of the above teachings. It is therefore to be understood that within the scope of the appended claims, the invention may be practiced otherwise than as specifically described herein.

TABLE 1

| | EVOH (A) | | | | | | | Characteristics of Resin composition (C) | | | | | | | |
|---|---|---|---|---|---|---|---|---|---|---|---|---|---|---|---|
| | EVOH (a) | | EVOH (b) | | Blend ratio (b)/ [(a) + (b)], | Compound (B) | | | Untreated | | Treated with alkaline solv. | | \|{T(1) − T(2)} | | Resin layer (D) | |
| | Et.C. mol % | S.D. mol % | Et. C. mol % | S.D. mol % | (wt %) | Type * | Blend ratio (B)/(A) (wt %) | SP | T(1) °C. | T(2) °C. | t(1) °C. | t(2) °C. | {t(1) − t(2)}\| | \|t(1) − T(1)\| | Type | SP |
| Example | | | | | | | | | | | | | | | | |
| 1 | 38 | 99.5 | 48 | 96.4 | 50 | — | 0 | — | 175 | 155 | 176 | 165 | 9 | — | Admer-EVA | 9 |
| 2 | 38 | — | 48 | — | 50 | — | 0 | — | 175 | 154 | 176 | 165 | 10 | — | Admer-EVA | 9 |
| 3 | 38 | — | 48 | — | 50 | — | 0 | — | 176 | 160 | 176 | 165 | 5 | — | Admer-EVA | 9 |
| 4 | 44 | 96.5 | 48 | 99.6 | 50 | — | 0 | — | 159 | 159 | 163 | 163 | — | 4 | Admer-EVA | 9 |
| 5 | 44 | 96.5 | 48 | 99.6 | 50 | k | 4 | 11 | 157 | 157 | 162 | 162 | — | 4 | Admer-EVA | 9 |
| 6 | 44 | 96.5 | 48 | 99.6 | 70 | l | 4 | 11 | 157 | 157 | 162 | 162 | — | 5 | Admer-EVA | 9 |
| 7 | 48 | — | 52 | — | 30 | — | 0 | — | 159 | 142 | 159 | 152 | 10 | — | Admer-EVA | 9 |
| 8 | 48 | — | 52 | — | 30 | l | 4 | 11 | 157 | 140 | 159 | 152 | 10 | — | Admer-EVA | 9 |
| 9 | 44 | 96.5 | 48 | 99.6 | 70 | l | 4 | 11 | 157 | 157 | 162 | 152 | 10 | — | Admer- | 9 |

TABLE 1-continued

| | EVOH (A) | | | | Blend ratio (b)/ [(a) + (b)], (wt %) | Compound (B) | | | Characteristics of Resin composition (C) | | | | | | | Resin layer (D) | |
|---|---|---|---|---|---|---|---|---|---|---|---|---|---|---|---|---|---|
| | EVOH (a) | | EVOH (b) | | | | Blend ratio (B)/(A) (wt %) | | Untreated | | Treated with alkaline solv. | | $\lvert\{T(1) - T(2)\} - \{t(1) - t(2)\}\rvert$ | $\lvert t(1) - T(1)\rvert$ | | | |
| | Et.C. mol % | S.D. mol % | Et. C. mol % | S.D. mol % | | Type * | | SP | T(1) °C. | T(2) °C. | t(1) °C. | t(2) °C. | | | Type | SP |
| 10 | 48 | — | 52 | — | 30 | m | 4 | 10 | 157 | 139 | 159 | 152 | 11 | — | EVA Admer-EVA | 9 |
| 11 | 48 | — | 52 | — | 30 | n | 4 | 11 | 157 | 140 | 159 | 152 | 10 | — | EVA Admer-EVA | 9 |
| Comp. Ex. | | | | | | | | | | | | | | | | |
| 1 | 38 | 99.5 | — | — | 0 | — | 0 | — | 175 | 175 | 175 | 175 | — | 0 | Admer-EVA | 9 |
| 2 | 38 | 99.5 | 48 | 99.5 | 50 | — | 0 | — | 175 | 159 | 175 | 159 | — | 0 | Admer-EVA | 9 |
| 3 | 38 | — | 48 | — | 50 | — | 0 | — | 175 | 158 | 175 | 158 | — | 0 | Admer-EVA | 9 |
| 4 | 38 | — | 48 | — | 50 | — | 0 | — | 169 | 134 | 175 | 165 | 25 | — | Admer-EVA | 9 |

Note: In Examples 2, 3, 7 and 8 and Comparative Examples 3 and 4, solutions of ethylene-vinyl acetate copolymers having different ethylene contents in methanol were blended and the blends were then saponified.
Et. C: Ethylene content; S. D.: Degree of saponification
*(type of compound (B)): k: diethyl phthalate; l: glycerine monostearate
m: glycerine tristearate; n: benzylbutyl phthalate

TABLE 2

| | $19 - CH(A) \times 0.1 - SP(B)$ | $SP(B) - SP(D)$ |
|---|---|---|
| Example | | |
| 1 | — | — |
| 2 | — | — |
| 3 | — | — |
| 4 | — | — |
| 5 | 3.4 | 2 |
| 6 | 3.3 | 2 |
| 7 | — | — |
| 8 | 3.1 | 2 |
| 9 | 3.3 | 2 |
| 10 | 4.1 | 1 |
| 11 | 3.1 | 2 |
| Comp. Ex. | | |
| 1 | — | — |
| 2 | — | — |
| 3 | — | — |
| 4 | — | — |

TABLE 3

| | Characteristics of stretched film | | | | | | | | | | |
|---|---|---|---|---|---|---|---|---|---|---|---|
| | Appearance | | | Changing ratio of thickness unevenness, $X = X_2/X_1$ (Note 4) | | Oxygen transmission rate cc · 20μ/ m² · day · atm | | Heat shrinkability | | | Skin-pack characteristics Appearance | |
| | Transparency | Gels and aggregates (Note 1) | Stretchability (Note 2) | $X_2$ | | Just after preparation | After 1 month | Areal shrinkage (%), (Note 3) | $Y_2$ | Changing ratio of thickness unevenness, $Y = Y_2/Y_1$ (Note 5) | Crease | Collapse of the contents |
| Example | | | | | | | | | | | | |
| 1 | Good | Good | Slightly uneven | 0.65 | 13 | 30 | 31 | 60 | 1.98 | 3.0 | A little | A little |
| 2 | Good | A little | Good | 0.55 | 11 | 30 | 32 | 63 | 1.54 | 2.8 | Good | A little |
| 3 | Good | A little | Slightly uneven | 0.70 | 14 | 31 | 31 | 60 | 1.96 | 2.8 | A little | A little |
| 4 | Good | Good | | 0.54 | 10 | 23 | 24 | 63 | 1.40 | 2.6 | Good | A little |
| 5 | Good | Good | Good | 0.45 | 9 | 31 | 20 | 67 | 0.82 | 1.8 | Good | Good |
| 6 | Good | Good | Good | 0.60 | 9 | 29 | 19 | 67 | 1.08 | 1.8 | Good | Good |
| 7 | Good | A little | Good | 0.55 | 11 | 28 | 27 | 63 | 1.54 | 2.8 | Good | A little |
| 8 | Good | Good | Good | 0.54 | 9 | 29 | 19 | 67 | 0.98 | 1.8 | Good | Good |
| 9 | Good | Good | Good | 0.45 | 9 | 27 | 17 | 70 | 0.82 | 1.8 | Good | Good |
| 10 | Good | Good | Good | 0.48 | 8 | 29 | 19 | 68 | 0.96 | 2.0 | Good | Good |
| 11 | Good | Good | Good | 0.45 | 9 | 28 | 18 | 67 | 0.95 | 2.1 | Good | Good |
| Comp. Ex. | | | | | | | | | | | | |
| 1 | Good | Many | Very uneven | 3.50 | 50 | 30 | 30 | 47 | 34.8 | 11.6 | Serious | Serious |
| 2 | Good | Many | Very uneven | 2.00 | 40 | 20 | 20 | 50 | 19.2 | 9.6 | Serious | Serious |
| 3 | Good | A little | Very uneven | 6.00 | 40 | 24 | 25 | 60 | 18.0 | 9.0 | Serious | Serious |

TABLE 3-continued

| | Characteristics of stretched film | | | | | | | | | | |
|---|---|---|---|---|---|---|---|---|---|---|---|
| | Appearance | | | | Oxygen transmission rate cc · 20μ/ m² · day · atm | | Heat shrinkability | | | Skin-pack characteristics | |
| | | | | Changing ratio of thickness | | | | Changing ratio of thickness | | | |
| | | Gels and | | unevenness, | Just after | | Areal | | unevenness, | Appearance | |
| | Transparency | aggregates (Note 1) | Stretchability (Note 2) | $X_2$ | $X = X_2/X_1$ (Note 4) | preparation | After 1 month | shrinkage (%), (Note 3) | $Y_2$ | $Y = Y_2/Y_1$ (Note 5) | Crease | Collapse of the contents |
| 4 | Good | A little | Good | 1.50 | 10 | 96 | 95 | 68 | 3.72 | 6.2 | Good | A little |

Note 1: The appearance of each film specimen (10 cm × 10 cm) was visually observed and the number of gels and aggregates calculated. Good: Not visible; A little: 1-2 pieces; Many: 3-10 pieces
Note 2: The appearance of each of stretched films was visually observed.
Note 3: Areal pressure = [(A × B) − (a × b)]/(A × B) × 100 where: A(cm) and B(cm) are sized in the machine direction and transverse direction respectively of film before shrinkage and conditioned at 20° C., 0% RH, and a(cm) and b(cm) are those after shrinkage (immersion in hot water at 90° C. for 1 minute).
Note 4: Sample of multilayered film before stretching (10 cm × 10 cm) was measured for maximum, minimum and average thicknesses, from which $X_1$ was calculated. Sample of the same film after stretching was measured in the same manner and $X_2$ was calculated. Then $X = X_2/X_1$.
Note 5: Sample of multilayered film after stretching and before heat shrinking (10 cm × 10 cm) was measured for maximum, minimum and average thicknesses, from which $Y_1$ was calculated. Sample of the same film after heat shrinkage was measured in the same manner and $Y_2$ was calculated. Then $Y = Y_2/Y_1$.

What is claimed is:

1. A heat shrinkable film or multilayered film comprising at least one layer comprising an ethylene-vinyl alcohol copolymer (EVOH) (A)) having an average ethylene content of 20 to 60 mole % and an areal shrinkage when immersed in hot water at 90° C. for 1 minute of at least 10% and having characteristics satisfying the following equation (i):

$$1 \leq |\{T(1)-T(2)\}-\{t(1)-t(2)\}| \leq 20 \quad (i)$$

wherein $1 \leq |t(1)-T(1)| \leq 20$ in the case of $T(1)=T(2)$ and $t(1)=t(2)$; and wherein T(1) and T(2) represent peak temperature (°C.) on the highest temperature side and lowest temperature side respectively in differential scanning calorimetry (DSC) measurement of said EVOH (A), and t(1) and t(2) represent peak temperatures on the highest temperature side and lowest temperature side respectively originating from T(1) and T(2), respectively, in DSC measurement of said EVOH (A) after having been treated with an alkaline solvent.

2. A heat shrinkable film or multilayered heat shrinkable film according to claim 1, having an areal shrinkage when immersed in hot water at 90° C. for 1 minute of at least 30%.

3. A multilayered film according to claim 1, wherein said layer of said EVOH (A) further comprises 0.1 to 30 parts by weight based on 100 parts by weight of EVOH (A) of a compound (B) satisfying the following equations (iv) and (v), and further having at least one resin layer (D) satisfying the following equation (iv):

$$5.5 \leq 19-CH(A) \times 0.1-SP(B) \geq 1.5 \quad (iv)$$

$$-1 \leq SP(B)-SP(D) \leq 3.5 \quad (v)$$

wherein CH(A) represents the average ethylene content in mole % of EVOH (A), SP(B) represents the solubility parameter (Fedor's formula) of the compound (B) and SP(D) represents the solubility parameter (Fedor's formula) of the resin (D) constituting the resin layer (D).

4. A multilayered heat shrinkable film according to claim 3, wherein said compound (B) satisfying the conditions (iv) and (v) is a hydrophobic plasticizer.

5. A heat shrinkable film or multilayered heat shrinkable film according to claim 1, which has an areal shrinkage when immersed in hot water at 90° C. for 1 minute of at least 50%.

6. A heat shrinkable film or multilayered heat shrinkable film according to claim 1, wherein the uniformity of shrinkage as measured by $Y_2$=(maximum temperature−minimum thickness)/average thickness) after heat shrinkage is not more than 3.

7. A heat shrinkable film or multilayered heat shrinkable film according to claim 1, wherein the index of non-uniform shrinkage Y as determined by the following equation is not more than 5:

$$Y = Y_2/Y_1 \leq 5$$

wherein
$Y_1$=(maximum thickness−minimum thickness/average thickness) before heat shrinkage; and
$Y_2$=(maximum thickness−minimum thickness/average thickness) after heat shrinkage.

* * * * *

UNITED STATES PATENT AND TRADEMARK OFFICE
CERTIFICATE OF CORRECTION

PATENT NO. : 5,344,715
DATED : September 6, 1994
INVENTOR(S) : Taichi Negi et al.

It is certified that error appears in the above-identified patent and that said Letters Patent is hereby corrected as shown below:

In Claim 3, (Col. 18, line 20, Formula (iv)),

"$5.5 \leq 19\text{-CH(A)} \times 0.1\text{-SP(B)} \geq 1.5$" should read

--$5.5 \geq 19\text{-CH(A)} \times 0.1\text{-SP(B)} \geq 1.5$--

In Claim 6, (Col. 18, line 39,

"$Y_2$=(maximum temperature-minimum thickness)--" should read

--$Y_2$=(maximum thickness-minimum thickness)-- --.

Signed and Sealed this

Twenty-fifth Day of October, 1994

Attest:

BRUCE LEHMAN

Attesting Officer

Commissioner of Patents and Trademarks